Jan. 1, 1946.  S. ZORICH  2,392,211
ROTARY ENGINE
Filed July 21, 1944  3 Sheets-Sheet 1

INVENTOR.
STEPHEN ZORICH.
BY Lockwood, Goldsmith & Galt,
ATTORNEYS.

Jan. 1, 1946. S. ZORICH 2,392,211
ROTARY ENGINE
Filed July 21, 1944 3 Sheets-Sheet 2

INVENTOR.
STEPHEN ZORICH.
BY
Lockwood, Goldsmith & Galt
ATTORNEYS.

Jan. 1, 1946.   S. ZORICH   2,392,211
ROTARY ENGINE
Filed July 21, 1944   3 Sheets-Sheet 3

INVENTOR.
STEPHEN ZORICH.
BY
Lockwood, Goldsmith & Galt
ATTORNEYS.

Patented Jan. 1, 1946

2,392,211

UNITED STATES PATENT OFFICE 2,392,211

ROTARY ENGINE

Stephen Zorich, Covington, Ky., assignor of ten per cent to Everett E. Peters, ten per cent to Arthur Briede, ten per cent to Charles L. Tumulty, and ten per cent to Forrest H. Tumulty Application July 21, 1944, Serial No. 546,024

3 Claims. (Cl. 123—17)

This invention relates to an engine structure, which may readily be adapted for gasoline, Diesel and steam application.

This invention, like that disclosed in copending application Serial No. 498,224 filed August 11th, 1943, and entitled "Rotary engine," may be comprised of multiple units axially aligned, and elements of adjacent units may be arcuately offset, and the cam of each may be arcuately adjusted, when desired or required, all as disclosed in said application and made a part hereof.

The chief object of this invention is to provide a power device which has a rotor subject to a plurality of power impulses for each revolution of the rotor.

The chief feature of the present invention is to provide a rocking vane in lieu of the radially reciprocatory one of the aforesaid application and thereby obtain all the advantages flowing from such use.

Other objects and features of the invention will be set forth more fully hereinafter.

The full nature of the invention will be understood from the accompanying drawings and the following description and claims.

Figure 1:
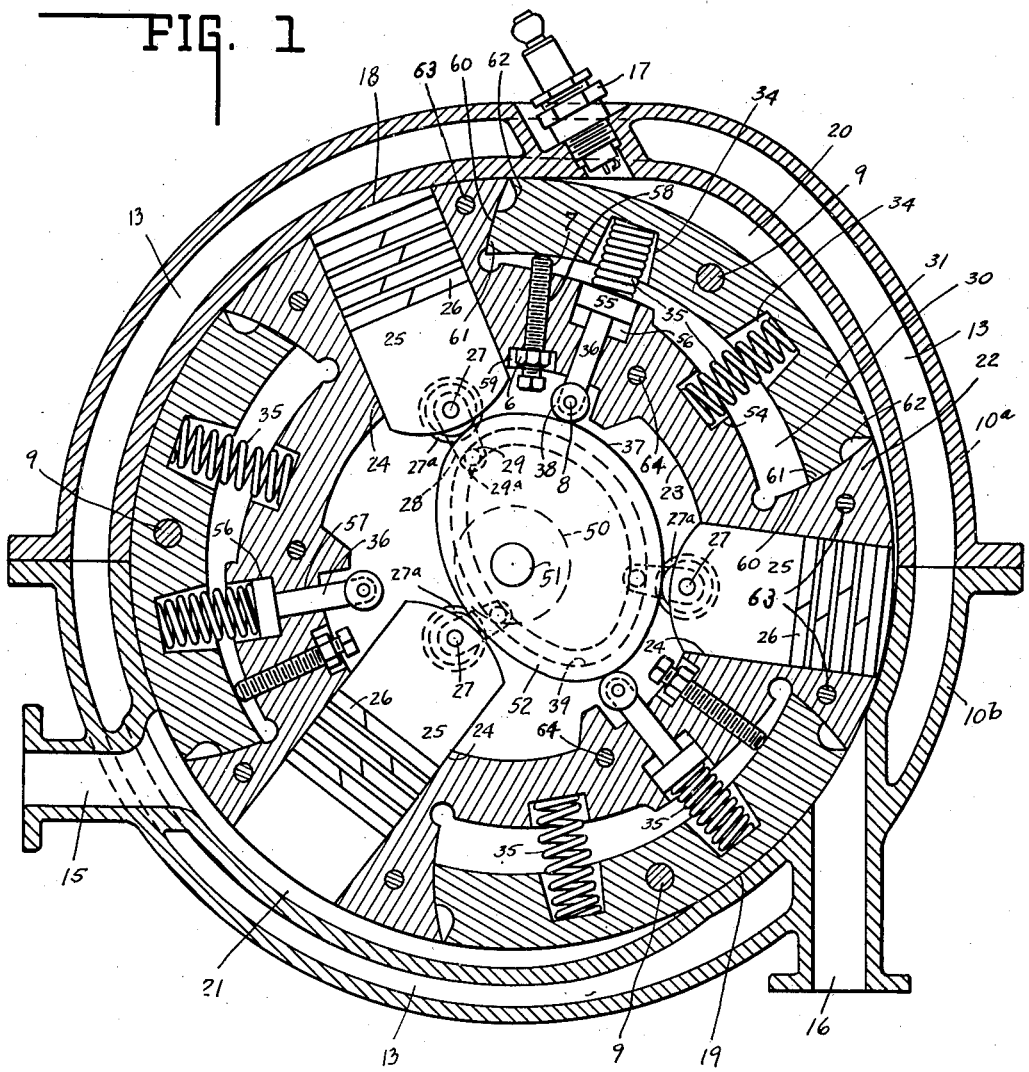
Figure 2:
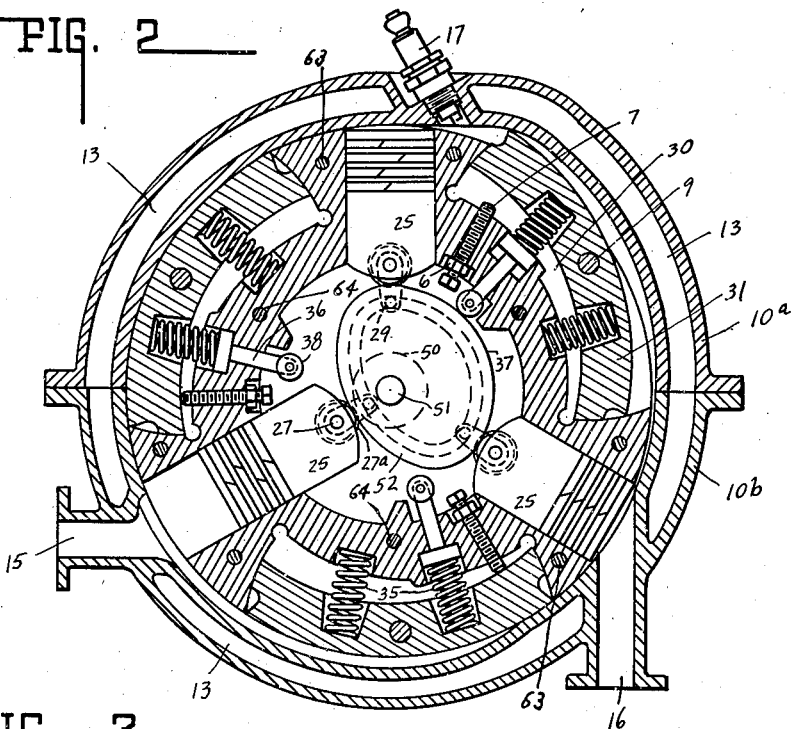
Figure 3:
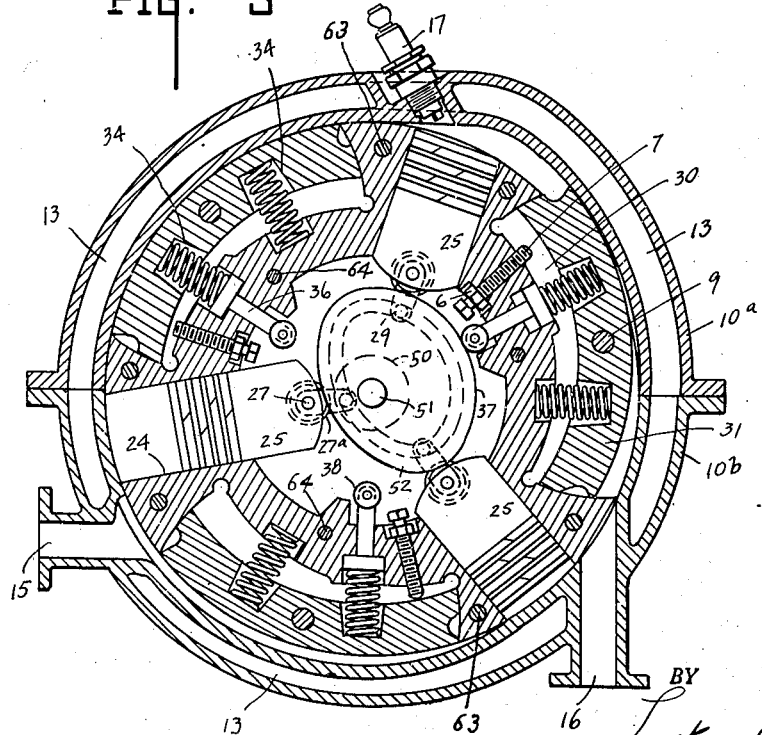
Figure 4:
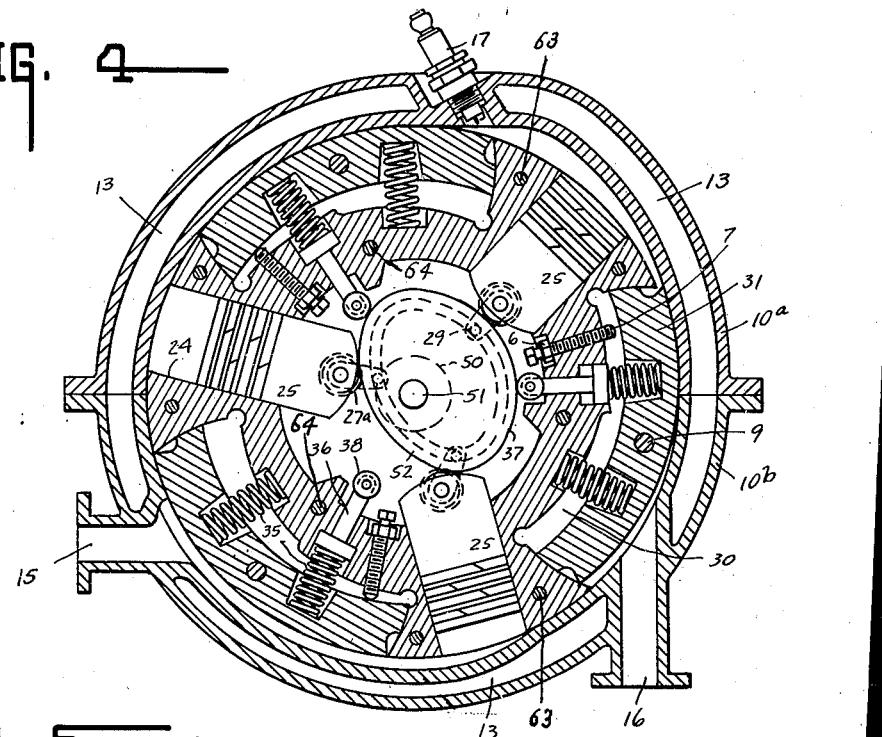
Figure 5:
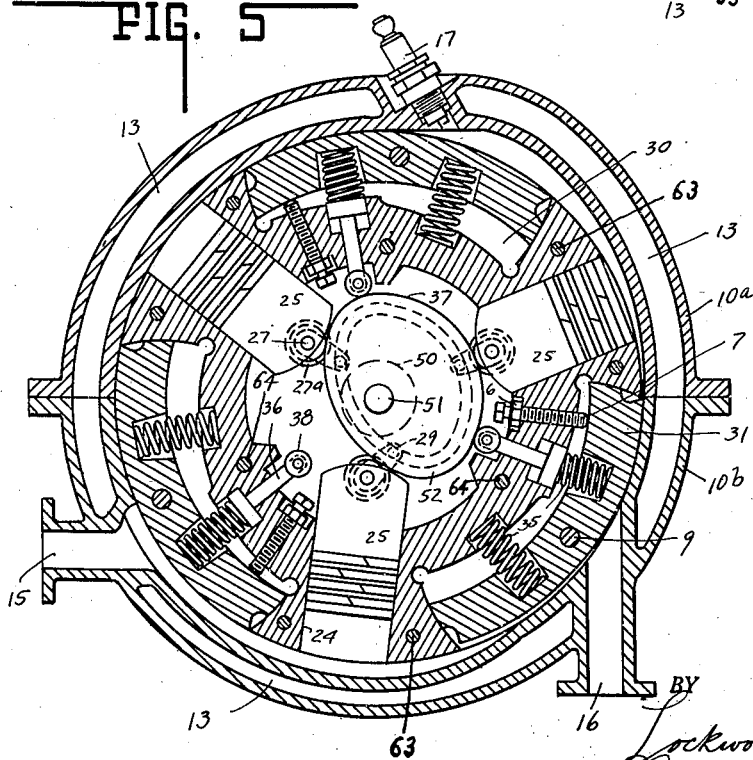

In the drawings Figs. 1 to 5 illustrate the invention in central section, Fig. 1 being on a slightly larger scale than the others for clearness, and each figure in succession illustrates a successive position of parts; Fig. 1 illustrating the "upper" piston approaching maximum compression position; Fig. 2 illustrating same at the instant of maximum compression position; Fig. 3 illustrating same shortly after firing; Fig. 4 illustrating same approximately half between firing and exhaust; and Fig. 5 illustrating same shortly prior to exhaust.

Since the copending application discloses a multiple unit embodiment and means for adjusting angularly the control cam, same for clearness and simplicity is omitted herefrom, but either may be employed.

A two-part housing 10a and 10b is suitably secured together and includes a water jacket 13 for cooling purposes. It also includes exhaust 16 and intake 15. Herein the circular chamber includes arcuate portions 18 and 19 and radially enlarged portions 20 and 21, the former being a part of the expansion or combustion chamber and the latter a part of the intake chamber portion.

Extending through one side of the housing is the main power shaft 50 and extending through the opposite side is the cam supporting shaft 51. A hollow circular rotor 22 is rigid with power shaft 50. Within the central bore 23 of said rotor 22 is the cam 52 rigid with cam supporting shaft 51. This shaft may have one end seated in a coaxial bearing in power shaft 50 and its opposite end is rotatably supported within the collar extension on the rotor opposite shaft 50 and extends beyond the housing for angular adjustment. The housing adjacent the shaft 51 rotatably supports the collar extension. Antifriction bearings may be utilized whenever and wherever desired. Rotor 22 may be divisible and the parts suitably secured together at 63 and 64. This general type of construction is fully disclosed in said copending application and no further reference herein appears necessary.

Herein, since three 120 degree spaced pistons are illustrated, there is provided three cylindrical radially directed bores 24 spaced 120 degrees apart. In each is a radially reciprocable piston 25 having rings 26. The inner end of each piston is suitably recessed and across same, parallel to the central axis, is a shaft 27, which rotatably supports grooved wheel 27a which straddles cam 52 at the periphery thereof and the root of the wheel bears on said periphery 37. The cam, except for adjustment, is stationary.

Herein shaft 27 pivotally supports one end of a link 28, the other end of which lies adjacent the side face of cam 52 and a roller 29 projects from said link and rides (and rolls) in groove 39, having the same shape as periphery 37. This groove is in the cam side face. Roller 29 is pivotally mounted on the link 28 at 29A. It will be obvious, if desired, the opposite face of cam 52 in the several figures may also have a corresponding groove 39 therein and another link 28, pivot 29A and roller 29 provided.

In rotor 23 rotation it will be obvious that from the "11:30 o'clock" position illustrated in Fig. 1, top piston 25 does not reciprocate until it reaches the "5 o'clock" position, then it is retracted until the "7:30 o'clock" position, and then it is advanced until at the "11:30 o'clock" position it is fully advanced.

The purpose of enlarging the housing chamber at 21 is now apparent, for while the piston is traversing same, as it were, it is gradually retracting to fill bore 24 (its cylinder) with fuel. When the piston has advanced beyond the intake chamber the fuel in said bore is trapped and is then compressed by the piston.

This trapped fuel is fired by plug 17 and the burning gases expand exerting pressure against a vane 31, which is arcuate and pivotally supported intermediate its ends on shaft 9 extending across arcuate recess or pocket 30 in the rotor periphery.

The inner arcuate face of rocker 31 is socketed at 34 at opposite sides of pivot 9 and in each is seated the outer end of radial springs 35. The forward spring has its inner end seated in pocket 54 in the recess 30 of the rotor. The other spring 35 has its inner end associated with member 55 reciprocable in radial bore 56 in the rotor and opening into pocket 30.

This bore 56 has an extension 57 which extends through the rotor and slidable therein is stem 36 which carries member 55. The inner projecting end of stem 36 mounts shaft 8, which mounts roller 38 that also rides the periphery 37 of cam 52.

Between cylinder bore 24 and stem bore 57—56 is a threaded radial bore 58, enlarged at 59 at its inner end. An adjustable stop bolt 7 is threaded therein and limited by nut 6 thereon and seating in bore enlargement 59.

In rotor rotation, stop 7 limits oscillation of the trailing end of rocking vane 31 toward the central axis under the influence of the advanced spring 35. The force of the rearward spring 35 is regulated by member 55 and hence by cam 52 during the combustion or power portion of the cycle.

Note that the fore and aft walls 60 of rotor pocket 30 are arcuate in section about axis of shaft 9 and the adjacent ends 61 of rocker 31 are correspondingly formed. Each face, however, is, near the outer end, relieved as at 62 and the value thereof appears in Figs. 2 and 3. Both ends are so relieved that the rockers may be reversed end for end to compensate for such wear as may occur and without requiring replacement by a new rocker.

The rotor may be of laminated construction to facilitate mounting of parts if, and when desired. It is cam 52 which projects rocker outward at the trailing edge and same always follows the housing wall of chamber 20.

The rocker has a second function that is on the compression portion of the cycle, the trailing edge not only serves as a pivot, but also serves to limit the effect of centrifugal force tending to throw out the rocker from its bore. In the compression cycle the forward end of vane 31 serves as a seal to prevent compressed gas from escaping backward into intake chamber 21 (seal clearance determined by stop screw 7). Shaft 9 serves as a pivot to prevent centrifugal force from tending to throw out the rocker vane from its recess or pocket 30 in the rotor periphery.

Whenever steam is used as the propelling medium, the cam is replaced with a comparatively stationary crank having rods connected to the several pistons, instead of links, thereby actuating the pistons as the rotor rotates. In this instance also the steam is admitted at the spark plug opening instead of at intake 15.

From the several illustrations and the foregoing description, it will be obvious that there are three power applications per rotor revolution.

Note also the trailing edge of the rocker can never retract beyond that determined by its associated stop 7.

While the invention has been illustrated and described in great detail in the drawings and foregoing description, the same is to be considered as illustrative and not restrictive in character.

The several modifications described herein as well as others, which will readily suggest themselves to persons skilled in this art, all are considered to be within the broad scope of the invention, reference being had to the appended claims.

The invention claimed is:

1. In a rotary engine having a casing with a central chamber therein, a rotor rotatably mounted therein, the rotor having a central bore, a cam within the rotor central bore, means coaxially supporting the cam and rotor in the casing, a portion of said means extending therethrough and beyond the same for power shaft purpose, the casing having arcuately spaced intake and exhaust means, a plurality of equally and arcuately spaced pistons radially reciprocable in the rotor, and means operatively connecting the several pistons and the cam for predetermined piston reciprocation in rotor relative rotation, the combination of means in the rotor forming independent pockets in the rotor periphery and between the pistons, the pockets being arcuately spaced and between adjacent cylinders and separated therefrom, an elongated vane of arcuate character in each pocket and pivotally supported between its ends and in the pocket and in advance of the adjacent piston and independent of that piston, means normally positioning the pivoted vane with its outer face in registration with the rotor periphery, and positive means for each vane, independent of the piston, and directly associated with the cam for vane pivoting by the cam in rotor rotation, cam pivoting of the vane projecting the trailing portion of the vane outwardly towards and into casing chamber wall engagement, the cam actuation of the vane and that of the piston trailing same occurring in timed relation, the vane and trailing piston having overlapping periods of cam projection coincident with the power applying portion of the operating cycle of the engine.

2. An engine as defined by claim 1 wherein radially directed spring means is associated with each vane and upon opposite sides of the pivotal axis thereof.

3. An engine as defined by claim 1 wherein radially directed spring means is associated with each vane and upon opposite sides of the pivotal axis thereof, the spring means having dissimilar forces, the greater force being applied in opposition to and overcome by the cam operation, and stop means in each pocket limiting vane tilting incident to greater force spring means actuation when not cam opposed.

STEPHEN ZORICH.